United States Patent [19]

Watanabe

[11] Patent Number: 4,855,817
[45] Date of Patent: Aug. 8, 1989

[54] COLOR IMAGE SENSOR WITH OPTICAL DIFFUSION MEMBERS COVERING SETS OF COLOR FILTERS AND SEPARATED BY LIGHT SHIELDS TO OBTAIN ACCURATE COLOR REPRODUCTION

[75] Inventor: Yoshio Watanabe, Kawasaki, Japan

[73] Assignee: Kabushiki Kaisha Toshiba, Kawasaki, Japan

[21] Appl. No.: 74,998

[22] Filed: Jul. 14, 1987

[30] Foreign Application Priority Data

Jul. 15, 1986 [JP] Japan .................................. 61-166011

[51] Int. Cl.⁴ ............................................. H04N 1/028
[52] U.S. Cl. ........................................... 358/75; 358/55
[58] Field of Search .................... 358/44, 75, 55, 41

[56] References Cited

U.S. PATENT DOCUMENTS

| 4,589,035 | 5/1986 | Yamanishi et al. | 358/296 |
| 4,600,833 | 7/1986 | Shibata et al. | 250/216 |
| 4,663,661 | 5/1987 | Weldy et al. | 358/44 |
| 4,675,727 | 6/1987 | Sekizawa et al. | 358/75 |
| 4,707,615 | 11/1987 | Hosaka | 250/578 |
| 4,734,760 | 3/1988 | Futaki | 358/75 |

Primary Examiner—James J. Groody
Assistant Examiner—Robert M. Bauer
Attorney, Agent, or Firm—Cushman, Darby & Cushman

[57] ABSTRACT

Sets of color filters are located so that one color filter is above each photoelectric conversion element and each set of color filters forms a pixel. An optical diffusion member is provided over each set of color filters to cause the diffusion of light incident on the color filters. Light shields are placed between each optical diffusion member to shield each optical diffusion member.

7 Claims, 2 Drawing Sheets

COLOR IMAGE SENSOR WITH OPTICAL DIFFUSION MEMBERS COVERING SETS OF COLOR FILTERS AND SEPARATED BY LIGHT SHIELDS TO OBTAIN ACCURATE COLOR REPRODUCTION

BACKGROUND OF THE INVENTION

This invention relates to a color image sensor with color filters and optical diffusion members and, in particular, to a color image sensor adapted for a copying machine and facsimile equipment and adapted to subject a document image to a photoelectric conversion so as to form an image.

With the recent rapid increase in computer-assisted office automation, high-speed, high-resolution, and compact-sized copying machines, facsimile equipment, etc. have been developed as contact type image sensors. The term "contact type image sensor" means, in this case, an image sensor in which, in place of a conventional scale-down optical system equipped with a spherical lens, a light-convergent optical lens (Selfoc lens) is employed as an optical system, with an image sensor leading to a document plane, and in which a document image equal in size to the original is formed on the image sensing elements.

FIG. 5 shows contact type image sensor (CCD device) 21, which comprises a linear array of photoelectric conversion elements 22a, 22b, 22c. Color filters, for example, red (R), green (G), and blue (B) color filters 23a, 23b, 23c are arranged in a cyclic fashion on photoelectric conversion elements 22a, 22b, 22c. Each set consisting of an (R), a (G), and a (B) filter, along with their respective photoelectric conversion elements 22a, 22b, 22c constitute a picture element 24. Since image sensor 21 has the double advantage of achieving a high integration density and high-speed operation of picture elements 24 through the use of the integral-circuit technique, a color image on a document can be quickly read out through the reading of a respective image corresponding to each picture element, from the document by the aforementioned tricolor (R, G, B) filter.

In the aforementioned image sensor 21, however, a light shield 25, formed of, for example, an aluminum-evaporated film, is located at the boundary of each of photoelectric conversion elements 22a, 22b, 22c and at the boundary of each of color filters 23a, 23b, 23c. As a result, respective photoelectric elements 22a, 22b, 22c are independently and individually driven upon receipt of incident light. Where, therefore, an image is formed whose size is, for example, equal to or smaller than that of one photoelectric conversion element, there is the possibility that, due to the resolution of respective color filters 23a, 23b, 23c, a variation in the brightness level of the image may be read out as a variation in the hue and saturation levels of the image.

To put it another way, where the image on the document is smaller than one picture element (24) corresponding to the three photoelectric conversion elements on the image sensor, it cannot be imparted as an uniform image formation to the three photoelectric conversion elements, and thus the output balance among the respective photoelectric conversion elements is disturbed with respect to picture element 24, with the result that a true color image signal corresponding to the image on the document, that is, accurate color data on the color document, sometimes cannot be obtained.

Where, in particular, a monochromatic image is read out, it is not possible in the prior art to accurately read out the actual brightness, hue, and saturation levels as color image data, and the density of the document image.

SUMMARY OF THE INVENTION

It is accordingly the object of this invention to provide a new and improved color image sensor with color filters and optical diffusion members, which, even if a document image is smaller than one picture element of the image sensor, can still accurately read out the actual brightness, hue, and saturation levels as an original document color image, and density of that image, without disturbing the output balance among respective photoelectric conversion elements, as is encountered in a conventional color image sensor.

According to this invention, a color image sensor is provided, comprising a plurality of photoelectric conversion elements arranged in a straight line; a plurality of sets of filters of different colors, one color filter located on each photoelectric conversion element, so that each set of color filters form a pixel; an optical diffusion member provided on each set of color filters to diffuse light incident on each color filter in said set; and a plurality of light shields, one light shield disposed between adjacent pixels and adjacent optical diffusion members for shielding adjacent sets of color filters.

BRIEF DESCRIPTION OF THE DRAWINGS

These and other objects and features of this invention can be understood through the following embodiment, with reference to the accompanying drawings in which.

DETAILED DESCRIPTION OF THE PREFERRED EMBODIMENT

A color image sensor according to one embodiment of this invention will now be described below, with reference to the accompanying drawings.

Figure 2:
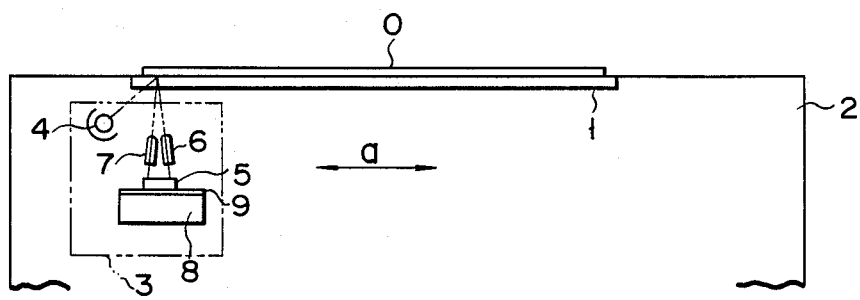
FIG. 2 is a side view diagrammatically illustrating an arrangement of a document operation section including the sensor of FIG. 1.

FIG. 2 shows a document scanning section of a copying machine body. Document glass (transparent glass) 1 is secured to copying machine body 2. Located below document glass 1 is scanner 3, which is moved reciprocally along a lower plane, in the direction indicated by an arrow A, to permit a document O, set on the surface of document glass 1, to be scanned optically. Scanner 3 comprises illumination lamp 4 for illuminating the document O, photoelectric conversion section 5 for receiving the light reflected from the document O, light-convergent optical lens (convergent rod lens array) 6, 7 for allowing the reflection light from the document O to photoelectric conversion section 5, and carriage 8 for supporting the aforementioned members.

Figure 3:
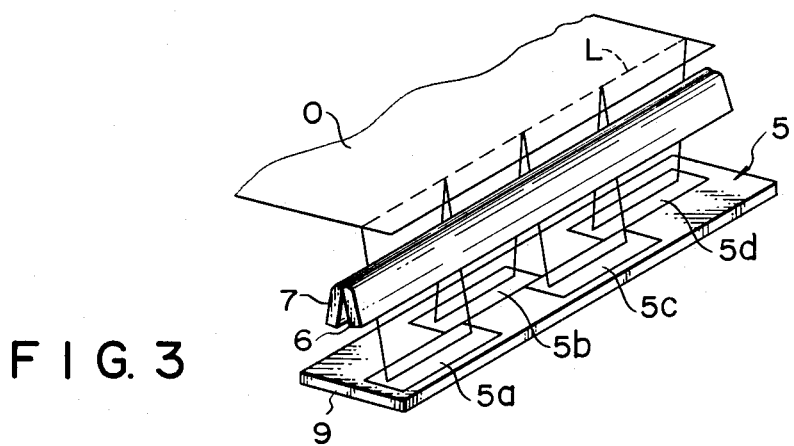
FIG. 3 is a perspective view diagrammatically illustrating an arrangement of the sensor of FIG. 1.

Photoelectric conversion section 5 includes four image sensing elements, 5a, 5b, 5c, and 5d which correspond to an alternate array of four divided parallel portions of a main scanning readout line L, as shown, for example, in FIG. 3, and which are adapted to individually receive four corresponding reflection light beams from the document O, to thereby achieve image formation, and which are arranged on printed circuit board (alumina board) 9.

The reflection beams from document O are conveyed by light-convergent optical lens 6 to image sensing elements 5a and 5c. The reflection beams from document O are conveyed by light-convergent optical lens 7 to image sensing elements 5b and 5d.

Figure 4:
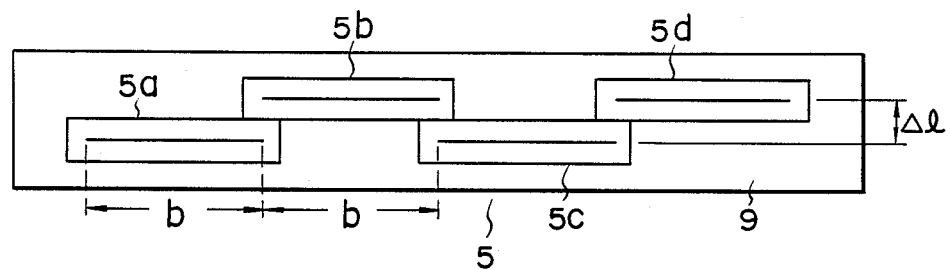
FIG. 4 is a plan view showing one form of an array of the color image sensors of FIG. 1.
Figure 5:
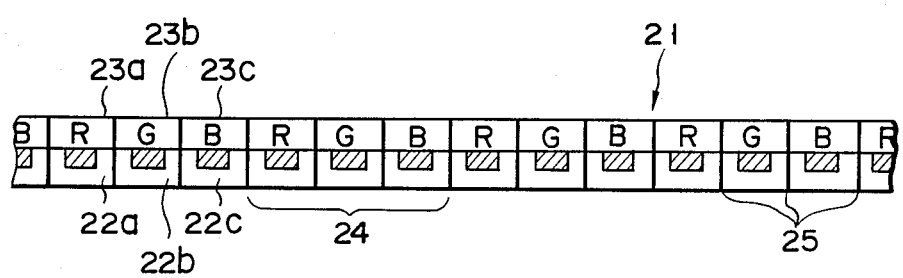
FIG. 5 is a view diagrammatically illustrating an arrangement of a prior art color image sensor section.

The image detection lines of image sensing elements 5a, 5c and 5b, 5d are arranged on printed circuit board 9 such that one of these lines is spaced a distance $\Delta l$ from the other line, in mutally parallel fashion, as is shown in FIG. 4. Image sensing elements 5a, 5b, 5c, 5d each have an effective readout length b, and thus a document O of a length (width) 4×b can be read out by four such image sensing elements. From this it will be appreciated that if an n number of each of image sensing elements 5a, 5b, 5c, 5d are arranged in the manner set forth above, it is possible to read out a document of n×b in length (width). In this way, it is possible to freely select any readout size for the document.

It should be noted that carriage 8 can be reciprocably moved by a moving mechanism, not shown, in a direction as indicated by an arrow a.

Figure 1:
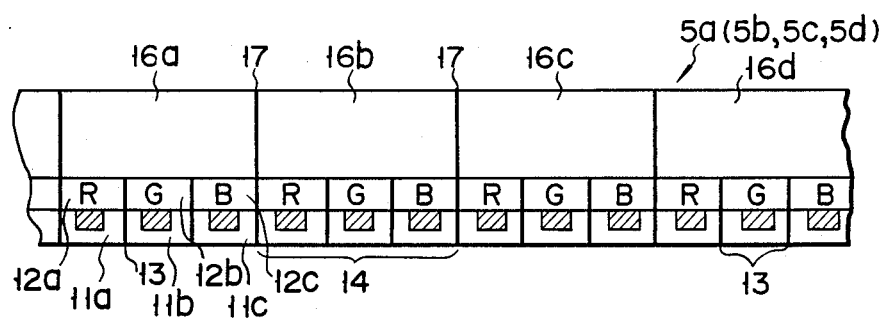
FIG. 1 is a diagrammatic view showing a color image sensor according to one embodiment of this invention.

FIG. 1 shows image sensing element 5a (5b, 5c, 5d) which comprises, for example, a CCD type line image sensing element (CCD element). In fact, image sensing elements 5a, 5b, 5c, 5d each comprise a plurality of photoelectric conversion elements 11a, 11b, 11c and, for example, red (R), green (G), and blue (B) color filters 12a, 12b, 12c, which are located in a cyclic fashion on photoelectric conversion elements 11a, 11b, 11c. Photoelectric conversion elements 11a, 11b, 11c correspond to color filters 12a, 12b, 12c, respectively, thereby to form three adjacent photoelectric conversion elements as one picture element 14. A light shield 13 formed of, for example, an aluminum-evaporated film is provided on the boundary of each of photoelectric conversion elements 11a, 11b, 11c in each picture element 14 and on the boundary of each of color filters 12a, 12b, 12c.

Light diffusion members 16a, 16b, 16c, 16d, each formed of, for example, a white color filter are provided one for each picture element. A light shield 17 is provided on the boundary of each of white color filters 16a, 16b, 16c, 16d; that is to say, one for each picture element 14. As a result, the reflection light beams from the document O, not shown, are diffused by light diffusion members 16, each of which is formed of a white color filter. At the same time, the reflection light beam is shielded, by light shield 17, from being mixed with the reflection light beams of the adjacent picture elements (14), and enters only a corresponding picture element 14. The aforementioned specific arrangement enables an equal amount of light to reach the corresponding color filters in the respective picture element.

Light shield 17 is provided by forming an aluminum film of a predetermined thickness on color filters 12a, 12b, 12c by use of a vapor evaporation method and by etching the aluminum layer of the white color filter (light diffusion member) formation area. Thereafter, white color filters (light diffusion members), 16a, 16b, 16c, 16d are formed on the etched areas.

As has been set forth above, for example, the light diffusion members (white color filters) for diffusing incident light are provided on the red (R), green (G), and blue (B) color filters, to enable the respective color filters in the respective picture elements to receive an equal amount of light. Thus, the white color filters are shielded by the light shield for the respective picture element, to thereby prevent the light beam on one picture element from becoming mixed with the light beam on an adjacent picture element. It is, therefore, possible to accurately read out the level of brightness of the color image, and to read out the actual hue and saturation levels through the uniform filtering of light by the respective color filters. Where the image of the document is smaller than the size of one picture element of the image sensing element, it is still possible to accurately read out the brightness, hue, and saturation levels as the image, and the density thereof, as a color image signal corresponding to an original color document image.

Although, in the aforementioned embodiment, this invention has been explained as using the red (R), green (G), and blue (B) color filters, the invention can equally be achieved using organic-based complementary color filters of, for example, cyan (C), green (G), and yellow (Y) colors.

Although the white color filters have been explained as being formed over the red (R), green (G), and blue (B) color filters, frosted glass may instead be formed with a light shield for each picture element. Even if the reading operation is performed, for example, in a sub-scanning direction, as opposed to the main scanning direction, it is still possible, as in the aforementioned embodiment, to accurately read out the brightness, hue, and saturation levels of a color image.

This invention is not restricted to the aforementioned embodiments only, and can be changed or modified without departing from the spirit and scope of the invention.

Where, for example, the light diffusion member is formed of a white color filter, use may be made of the same material as that of which each of the color filters are made. Frosted glass or gelation, for example, may also be used instead. In short, all that is necessary is that incident light be diffused in a manner to enable an uniform amount of light to be incident on the respective color filters for the respective picture element.

As set out above, a color image sensor according to this invention can be manufactured which, even if the image of the document is smaller than the size of one picture element of the image pickup element, can still accurately read out the brightness, hue, and saturation levels of the color image, as well as its density.

What is claimed is:

1. A color image sensor comprising:
   a plurality of photoelectric conversion elements arranged in a straight line;
   a plurality of sets of filters of different colors, one color filter located on each photoelectric conversion element, so that each set of color filters form a pixel;
   an optical diffusion member provided on each set of color filters to diffuse light incident on each color filter in each set; and
   a plurality of light shields, one light shield disposed between adjacent pixels and adjacent optical diffusion members for shielding adjacent sets of color filters.

2. A color image sensor according to claim 1, wherein said optical diffusion members are white color filters.

3. A color image sensor according to claim 1, wherein said optical diffusion members are made of frosted glass.

4. A color image sensor according to claim 1, wherein said optical diffusion members are made of gelatin.

5. A color image sensor according to claim 1, wherein said sets of color filters include red, green, and blue color filters.

6. A color image sensor device comprising:
a circuit board; and
a plurality of image sensing elements arranged on said circuit board in a staggered and overlapping manner, each of said image sensing elements comprising:
    a plurality of photoelectric conversion elements arranged in a straight line,
    a plurality of sets of filters of different colors, one color filter located on each photoelectric conversion element, so that each set of color filters form a pixel,
    an optical diffusion member provided on each set of color filters to diffuse light incident on each color filter in each set, and
    a plurality of light shields, one light shield disposed between adjacent pixels and adjacent optical diffusion members for shielding adjacent sets of color filters.

7. A color image sensor apparatus comprising:
a circuit board;
a plurality of image sensing elements arranged on said circuit board in an overlapping and staggered manner, each of said image sensing elements comprising:
    a plurality of photoelectric conversion elements arranged in a straight line,
    a plurality of sets of filters of different colors, one color filter located on each photoelectric conversion element, so that each set of color filters form a pixel,
    an optical diffusion member provided on each set of the color filters to diffuse light incident on each color filter in each set, and
    a plurality of light shields, one light shield disposed between adjacent pixels and adjacent optical diffusion members for shielding adjacent sets of color filters; and
a pair of light-convergent optical lenses that focus image information on said image sensing elements.

* * * * *